United States Patent
Jang et al.

(10) Patent No.: US 7,505,670 B2
(45) Date of Patent: Mar. 17, 2009

(54) METHOD, APPARATUS, AND MEDIUM FOR CONTROLLING DIGITAL VIDEO RECORDING

(75) Inventors: Won-kap Jang, Seoul (KR); Jung-woo Kim, Seoul (KR); Woo-sung Shim, Suwon-si (KR); Jong-gu Jeon, Suwon-si (KR)

(73) Assignee: Samsung Electronics Co., Ltd. Co., Suwon-Si (KR)

( * ) Notice: Subject to any disclaimer, the term of this patent is extended or adjusted under 35 U.S.C. 154(b) by 727 days.

(21) Appl. No.: 11/116,438

(22) Filed: Apr. 28, 2005

(65) Prior Publication Data

US 2005/0254794 A1 Nov. 17, 2005

(30) Foreign Application Priority Data

Apr. 29, 2004 (KR) .................... 10-2004-0029848

(51) Int. Cl.
*H04N 5/00* (2006.01)
*H04N 7/00* (2006.01)
(52) U.S. Cl. .................................. 386/46; 386/125
(58) Field of Classification Search .............. 386/46, 386/52, 125, 124, 117, 107
See application file for complete search history.

(56) References Cited

FOREIGN PATENT DOCUMENTS

| JP | 6-217248 | | 8/1994 |
|---|---|---|---|
| JP | 9-200740 | * | 7/1997 |
| JP | 11-88819 | | 3/1999 |
| KR | 1990-10699 | | 7/1990 |
| KR | 100301472 | | 6/2001 |

* cited by examiner

*Primary Examiner*—Robert Chevalier
(74) *Attorney, Agent, or Firm*—Staas & Halsey LLP

(57) ABSTRACT

A method and apparatus for controlling digital video recording where parameters related to encoding video frames that are being currently encoded are stored when a pause command is received during recording and the method and apparatus continually record, based on the stored parameters, when the pause command stops, and a camcorder including the pause function. The method includes: receiving a pause command; storing parameters related to encoding video frames that are presently being encoded in a memory, and then stop encoding video frames that are input after the parameters are stored in the memory; and encoding video frames that are input after receiving a pause release command using parameter information related to encoding when the pause release command is received. Thus, video recording efficiency can be improved by having the pause function.

19 Claims, 4 Drawing Sheets

METHOD, APPARATUS, AND MEDIUM FOR CONTROLLING DIGITAL VIDEO RECORDING

CROSS-REFERENCE TO RELATED APPLICATIONS

This application claims the benefit of Korean Patent Application No. 10-2004-0029848, filed on Apr. 29, 2004 in the Korean Intellectual Property Office, the disclosure of which are incorporated herein in its entirety by reference.

BACKGROUND OF THE INVENTION

1. Field of the Invention

The present invention relates to a digital video camcorder including a pause function. More particularly, the present invention relates to a method, apparatus, and medium for controlling digital video recording where parameters related to encoding video frames that are being currently encoded are stored when a pause command is received during recording, and a method, apparatus, and medium for continually recording based on the stored parameters when the pause command stops.

2. Description of the Related Art

FIG. 1 is a perspective view of a conventional digital camcorder.

In the conventional digital camcorder that stores an encoded video in a memory using a codec, the digital camcorder starts recording when a record start/stop button 110 is pressed and stops recording when the record start/stop button 110 is pressed again. The record start/stop button 110 may be provided as separate buttons: a record start button and a record stop button. A video recorded from when the record start button is pressed until the record stop button is pressed is stored as a file, and a video recorded from when the record start button is pressed again until the record stop button is pressed again is stored as another file.

FIG. 2 is a flow chart illustrating a conventional process of digital video recording.

The digital camcorder is in standby (S210) and determines whether the record start button has been pressed (S220). If the record start button has been pressed, recording begins (S230) but if not, the digital camcorder continues to be in standby. The digital camcorder determines whether the record stop button has been pressed during recording (S240) and if the record stop button has been pressed, a file in which the recorded video is stored is closed and the parameters related to encoding the video are reset (S250). Recording continues if the record stop button has not been pressed. The parameters related to encoding the video includes a reference frame used for encoding the present frame, a bit rate information, a number of bits used for encoding the frames, and quantization parameters.

However, when recording an image using only the record start button and the record stop button as described above, encoding parameters are unnecessarily re-calculated since the parameters related to encoding are reset every time the record stop button is pressed even when wanting to briefly pause between recording and continuing to record similar images. In addition, there is an inconvenience of having to use, for example, an image editor to manage the videos in a single file since videos are stored in separate files whenever the record stop button is pressed.

SUMMARY OF THE INVENTION

Additional aspects and/or advantages of the invention will be set forth in part in the description which follows and, in part, will be apparent from the description, or may be learned by practice of the invention.

Exemplary embodiments of the present invention provide a method, apparatus, and medium for controlling digital video recording where parameters related to encoding video frames that are being currently encoded are stored when a pause command is received during recording, and a method, apparatus, and medium for continually recording based on the stored parameters when the pause command stops. Exemplary embodiments of the present invention may provide a camcorder including the pause function.

According to an aspect of the present invention, there is provided a method of controlling digital video recording including: encoding video frames, receiving a pause command; storing parameters related to encoding video frames that are presently being encoded in a memory, stopping encoding video frames after the parameters are stored in the memory; receiving a pause release command; and encoding video frames after receiving the pause release command using the stored parameters related to encoding video frames.

The method further includes receiving a record stop command, and closing a file in which the encoded video frames are stored when the record stop command is received.

In the closing of the file, the encoded video frames are stored in a single file and the stored single file is closed when the record stop command is received.

The video frames may be external input images input via a digital camcorder. The video frames may be encoded by the digital camcorder to provide encoded video frames.

Also, the parameters related to encoding include reference frame information that is used in encoding the present frame, wherein the reference frame information includes rate control information, bit rate information, a number of bits used for encoding the video frames, and quantization parameters.

Also, the parameters related to encoding may include at least one of rate control, bit rate information, a number of bits used for encoding the video frames, and quantization parameters. The parameters may be variables.

According to another aspect of the present invention, a computer readable recording medium on which a computer program for performing the methods of various aspects of the present invention is recorded thereon.

According to another aspect of the present invention, there is provided an apparatus for controlling digital video recording including: a command input unit to receive a user command including a record command, a record stop command, a pause command, and a pause release command; an encoding parameter storage unit to store parameters related to encoding a video frame that is presently being encoded when the pause command is received; and an encoder that encodes video frames that are input after receiving the record command in accordance with the stored parameters, stops encoding video frames that are input after the pause command is received, and is in standby until the pause release command is received, the encoder encoding video frames that are input after the pause release command is received using the stored parameters related to encoding when the pause command is received.

The encoder closes a file in which the encoded video frames are stored when the record stop command is received.

The encoded video frames may be stored in a single file and the stored single file may be closed when the record stop command is received. The video frames external The video frames may be external input images input via a digital camcorder. The video frames may be encoded by the digital camcorder to provide encoded video frames.

Also, the parameters related to encoding may include at least one of rate control, bit rate information, a number of bits used for encoding the video frames, and quantization parameters. The parameters may be variables.

According to another aspect of the present invention, there is provided a camcorder including an encoder including a pause button, the encoder storing parameters related to encoding video frames that are presently being encoded in a memory, and stop encoding video frames that are input after the parameters are stored in the memory and is in standby until a pause release command is received, the encoder encoding video frames that are input after the pause release command is received using the stored parameter information related to encoding when the pause command is received.

The encoder may close a file in which the encoded video frames are stored when the record stop command is received.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
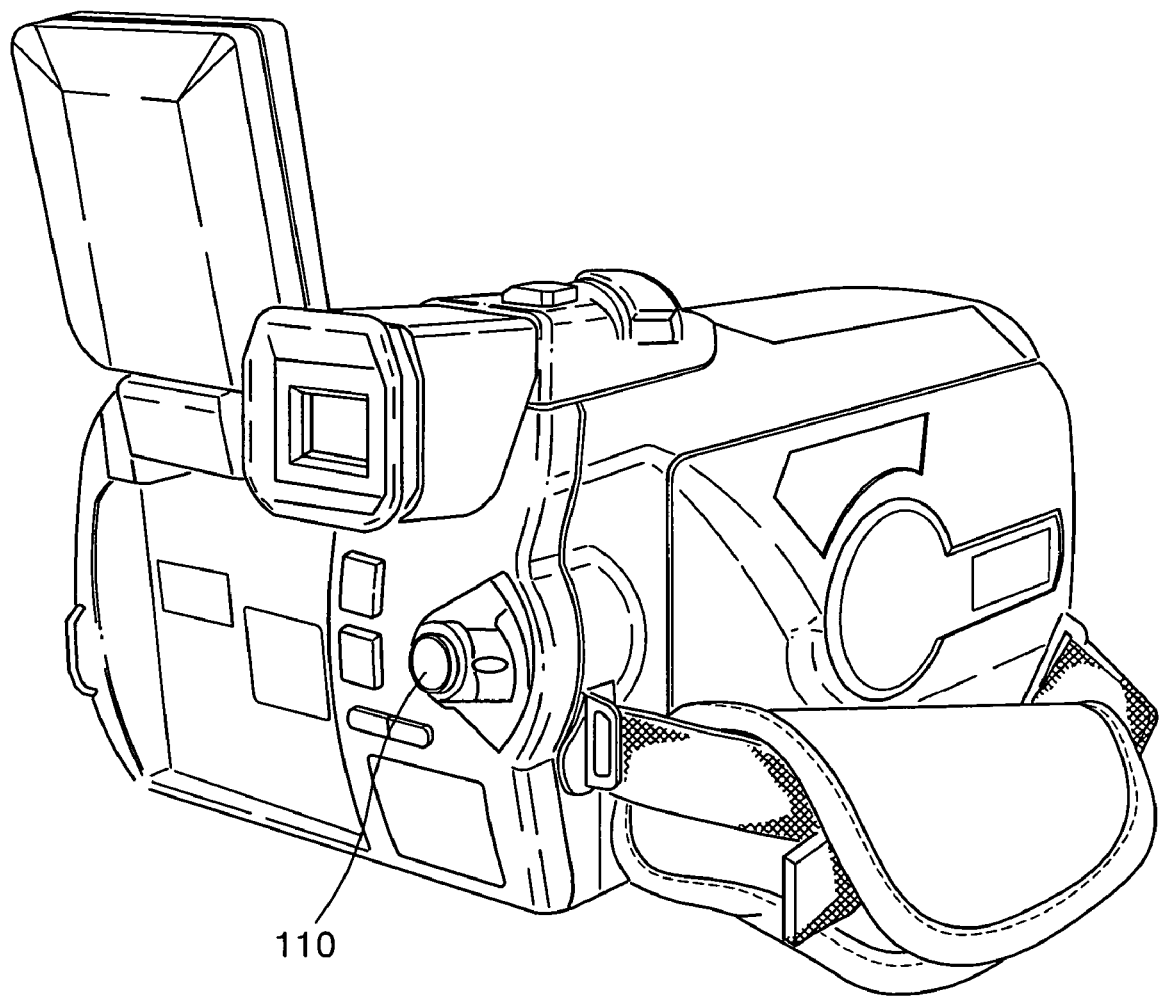
FIG. 1 is a perspective view of a conventional digital camcorder.
Figure 2:
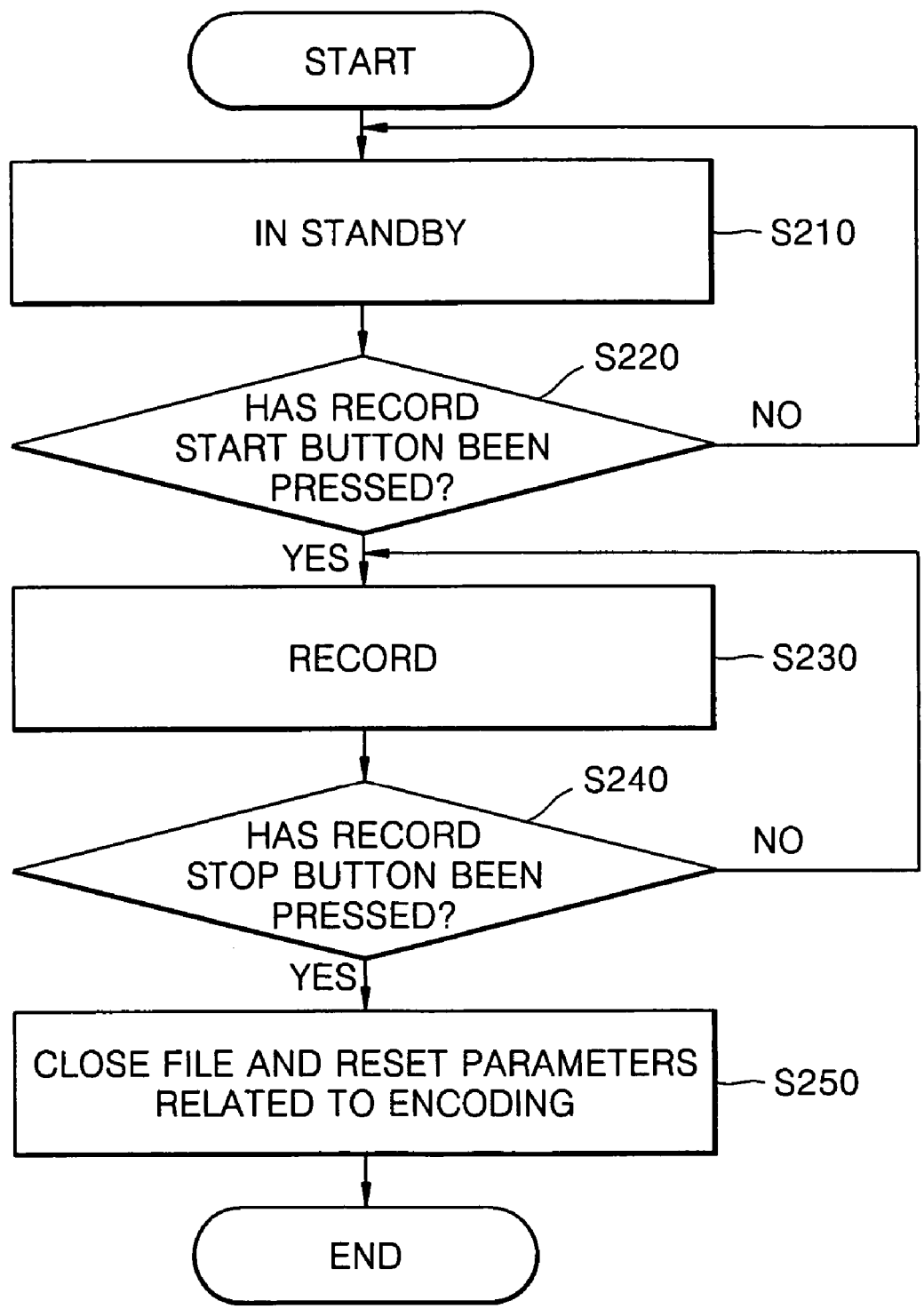
FIG. 2 is a flow chart illustrating a conventional process of digital video recording.

Reference will now be made in detail to the exemplary embodiments of the present invention, examples of which are illustrated in the accompanying drawings, wherein like reference numerals refer to the like elements throughout. The exemplary embodiments are described below to explain the present invention by referring to the figures.

Figure 3:
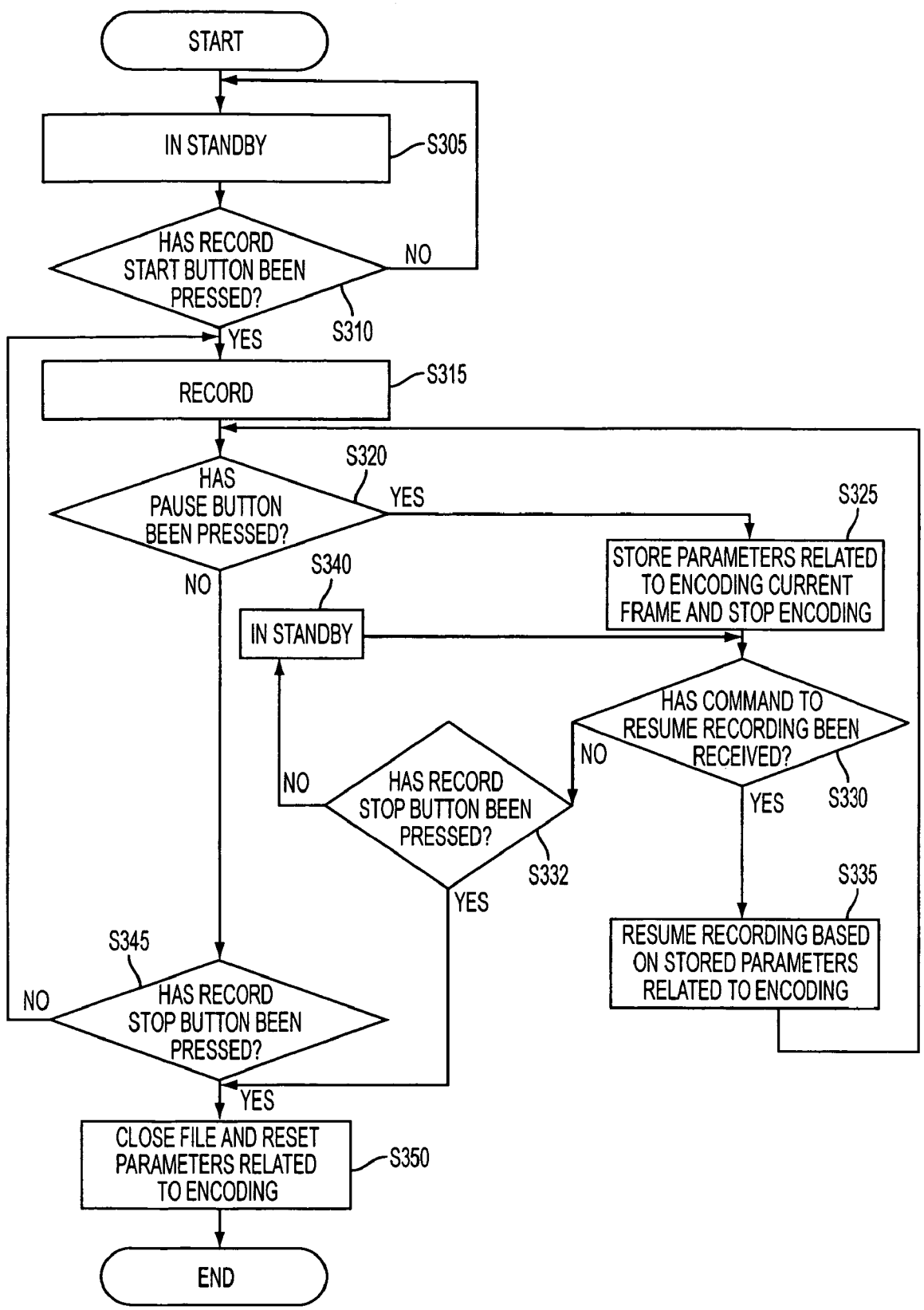
FIG. 3 is a flow chart illustrating a method of controlling digital video recording according to an exemplary embodiment of the present invention.

FIG. 3 is a flow chart illustrating a method of controlling digital video recording according to an exemplary embodiment of the present invention.

A digital camcorder is in standby (S305) and determines whether a record start button has been pressed (S310). If the record start button has been pressed, recording begins (S315). If the record button has not been pressed, the digital camcorder continues to be in standby. The digital camcorder determines whether a record pause button has been pressed during recording (S320). If the record pause button has been pressed, parameters related to encoding a video frame that is currently being encoded is stored in a memory. Then, encoding of a video frame, which is input after storing the parameters, stops (S325). The parameters related to encoding can be stored in the memory, but the memory in which the parameters are stored can be maintained the way it is by not resetting the memory, and thus the parameters can be used in the future.

If a pause button has not been pressed, recording continues. If a record button to resume recording has been pressed (S330), input frames are encoded based on the parameters related to encoding stored in the memory (S335), and then, the digital camcorder determines whether the pause button has been pressed (S320). If a record resume command is not received and a record stop button is not received (S332), the digital camcorder is in standby (S340).

If the digital camcorder determines that the record stop button has been pressed (S332 or S345), a file in which the recorded video is stored is closed and the parameters related to encoding the video are reset (S350).

That is, recording starts when the record start button is pressed and continues recording until the record stop button or the pause button is pressed. The parameters used for encoding the present frame are stored in the memory if the pause button is pressed and encoding of frames input after storing the parameters is stopped. When the pause button is pressed again or the record start button is pressed again in the present state, future input frames are encoded based on the stored parameters for encoding. Encoding of the frames continues as described above until the record stop button is pressed. When the record stop button is pressed, an encoded stream is stored as a file in the memory.

The parameters related to encoding the video includes a reference frame used for encoding the present frame, variables related to rate control, a bit rate information, a number of bits used for encoding the frames, and quantization parameters. The parameter values change to perform encoding appropriate to the current input frame when encoding video but if the record stop button is pressed, the variables are all reset and the parameter values cannot be restored even if recording is immediately resumed. Therefore, encoding is performed while re-finding the parameter that is appropriate for the frame to perform encoding under the same condition, and thus processing power and time are unnecessary consumed.

Therefore, the pause function increases encoding efficiency by maintaining the parameters related to encoding or storing the parameters in the memory, temporarily stopping encoding the next frame until a command to resume recording is received, and then continuing to record under the same condition. When the above-mentioned method is used, it is especially useful when repeatedly recording in the same place (e.g., recording an interview or recording using a tripod). In addition, since a scene is photographed and stored in a single file when the pause button is used, the inconvenience of having to combine numerous files into one using an image editor is eliminated.

Figure 4:
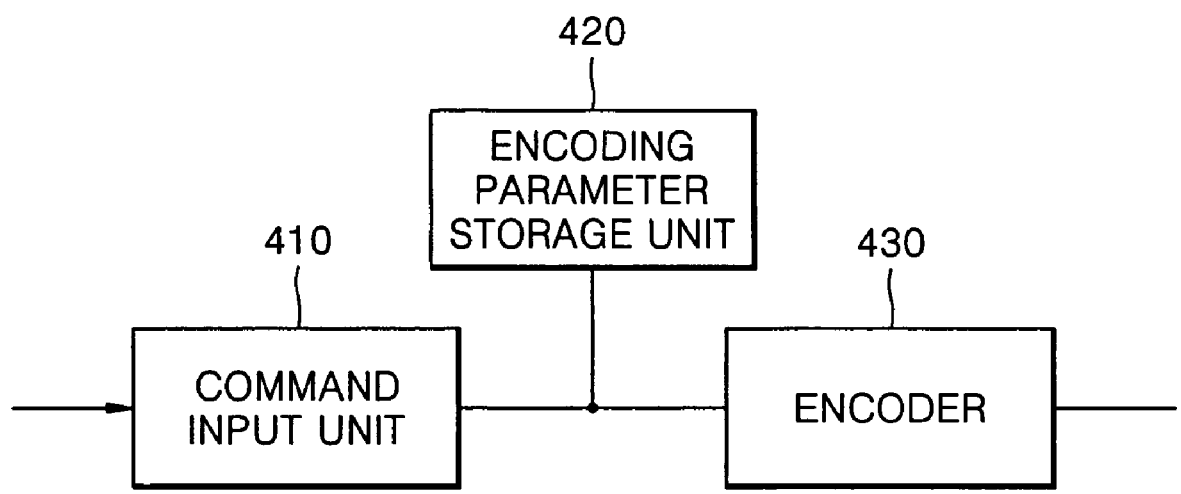
FIG. 4 is a block diagram of an apparatus for controlling digital video recording according to an exemplary embodiment of the present invention.

FIG. 4 is a block diagram of an apparatus for controlling digital video recording according to an exemplary embodiment of the present invention.

A command input unit 410 receives a user command including a record command, a record stop command, and a pause command. An encoding parameter storage unit 420 stores the parameters related to encoding the video frames that are being currently encoded when the pause command is received. An encoder 430 receives the record command and performs recording until the pause command is received. When the encoder 430 receives the pause command, encoding of video frames that are input from now on is stopped and the digital camcorder is in standby until a pause release command is received. When the encoder 430 receives the pause release command, video frames input from now on are encoded using the stored parameter information related to encoding, and when the encoder 430 receives the record stop command, the file in which the encoded video frame is stored closed.

According to the present invention as described above, encoding efficiency can be improved by resuming recording in the same recording condition. In addition, numerous images can be stored together in the same file a user desires.

A method of controlling digital video recording, as describe above, can be written as a computer program. Codes, code segments, and instructions that configure the program can be easily construed by computer programmers skilled in the art to which the present invention pertains. In addition, the program may be stored in computer readable media a computer or computing device can read, and is read by and operated by the computer or computing device, thereby executing the method of controlling the digital video recording. The computer readable media includes magnetic recording media, optical recording media, and transmission media such as carrier wave media.

The exemplary embodiments shown and discussed above can be applied to any digital camcorder or digital recording device including the camcorder shown in FIG. 1.

Although a few exemplary embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of controlling digital video recording comprising:
   encoding video frames;
   storing encoded video frames in a file;
   receiving a pause command;
   storing parameters related to encoding video frames that are presently being encoded in a memory;
   stopping encoding video frames after the parameters are stored in the memory without closing the file;
   receiving a pause release command; and
   encoding video frames and storing the encoded video frames in the file after receiving the pause release command using the stored parameters related to encoding video frames.

2. The method of claim 1, further comprising:
   receiving a record stop command; and
   closing the file in which the encoded video frames are stored when the record stop command is received.

3. The method of claim 2, wherein, in the closing of the file, the encoded video frames are stored in a single file and the stored single file is closed when the record stop command is received.

4. The method of claim 1, wherein the video frames are external input images input via a digital camcorder.

5. The method of claim 1, wherein the parameters related to encoding comprise reference frame information that is used in encoding the present frame, wherein the reference frame information includes rate control information, bit rate information, a number of bits used for encoding the video frames, and quantization parameters.

6. An apparatus for controlling digital video recording comprising:
   a command input unit to receive a user command including a record command, a record stop command, a pause command, and a pause release command;
   an encoding parameter storage unit to store parameters related to encoding a video frame that is presently being encoded when the pause command is received; and
   an encoder that encodes video frames that are input after receiving the record command in accordance with the stored parameters, stops encoding video frames that are input after the pause command is received without closing a file in which the encoded video frames are stored, and is in standby until the pause release command is received, the encoder encoding video frames that are input after the pause release command is received using the stored parameters related to encoding when the pause command is received.

7. The apparatus of claim 6, wherein the encoder closes the file in which the encoded video frames are stored when the record stop command is received.

8. The apparatus of claim 7, wherein, in the closing of the file, the encoded video frames are stored in a single file and the stored single file is closed when the record stop command is received.

9. The apparatus of claim 6, wherein the video frames are external input images input via a digital camcorder.

10. The apparatus of claim 6, wherein the parameters related to encoding comprise reference frame information that is used in encoding the present frame, wherein the reference frame information includes variables related to rate control, bit rate information, a number of bits used for encoding the video frames, and quantization parameters.

11. A camcorder comprising an encoder including a pause button, wherein the encoder stores parameters related to encoding video frames that are presently being encoded in a file in memory, and stops encoding video frames that are input after the parameters are stored in the file in memory without closing the file, and is in standby until a pause release command is received, the encoder encoding video frames that are input after the pause release command is received using the stored parameter information related to encoding when the pause command is received, and the encoder storing the encoded video frames in the file in memory.

12. The camcorder of claim 11, wherein the encoder closes the file in which the encoded video frames are stored when the record stop command is received.

13. A computer readable recording medium on which a computer program for performing the method in claim 1 is recorded thereon.

14. The method of claim 1, wherein the video frames are external input images input via a digital camcorder, and the video frames are encoded by the digital camcorder to provide encoded video frames.

15. The apparatus of claim 6, wherein the video frames are external input images input via a digital camcorder, and the video frames are encoded by the digital camcorder to provide encoded video frames.

16. The method of claim 1, wherein the parameters related to encoding include at least one of rate control, bit rate information, a number of bits used for encoding the video frames, and quantization parameters.

17. The method of claim 16, wherein the parameters are variables.

18. The apparatus of claim 6, wherein parameters related to encoding include at least one of rate control, bit rate information, a number of bits used for encoding the video frames, and quantization parameters.

19. he apparatus of claim 18, wherein the parameters are variables.

* * * * *

UNITED STATES PATENT AND TRADEMARK OFFICE
CERTIFICATE OF CORRECTION

PATENT NO.         : 7,505,670 B2                                              Page 1 of 1
APPLICATION NO. : 11/116438
DATED              : March 17, 2009
INVENTOR(S)        : Won-kap Jang et al.

It is certified that error appears in the above-identified patent and that said Letters Patent is hereby corrected as shown below:

Column 6, Line 64, change "he" to --The--.

Signed and Sealed this

Second Day of June, 2009

JOHN DOLL
*Acting Director of the United States Patent and Trademark Office*